July 14, 1931.　　F. S. HARTWELL　　1,814,922
TAPER BORING TOOL
Filed Dec. 17, 1926　　3 Sheets-Sheet 1
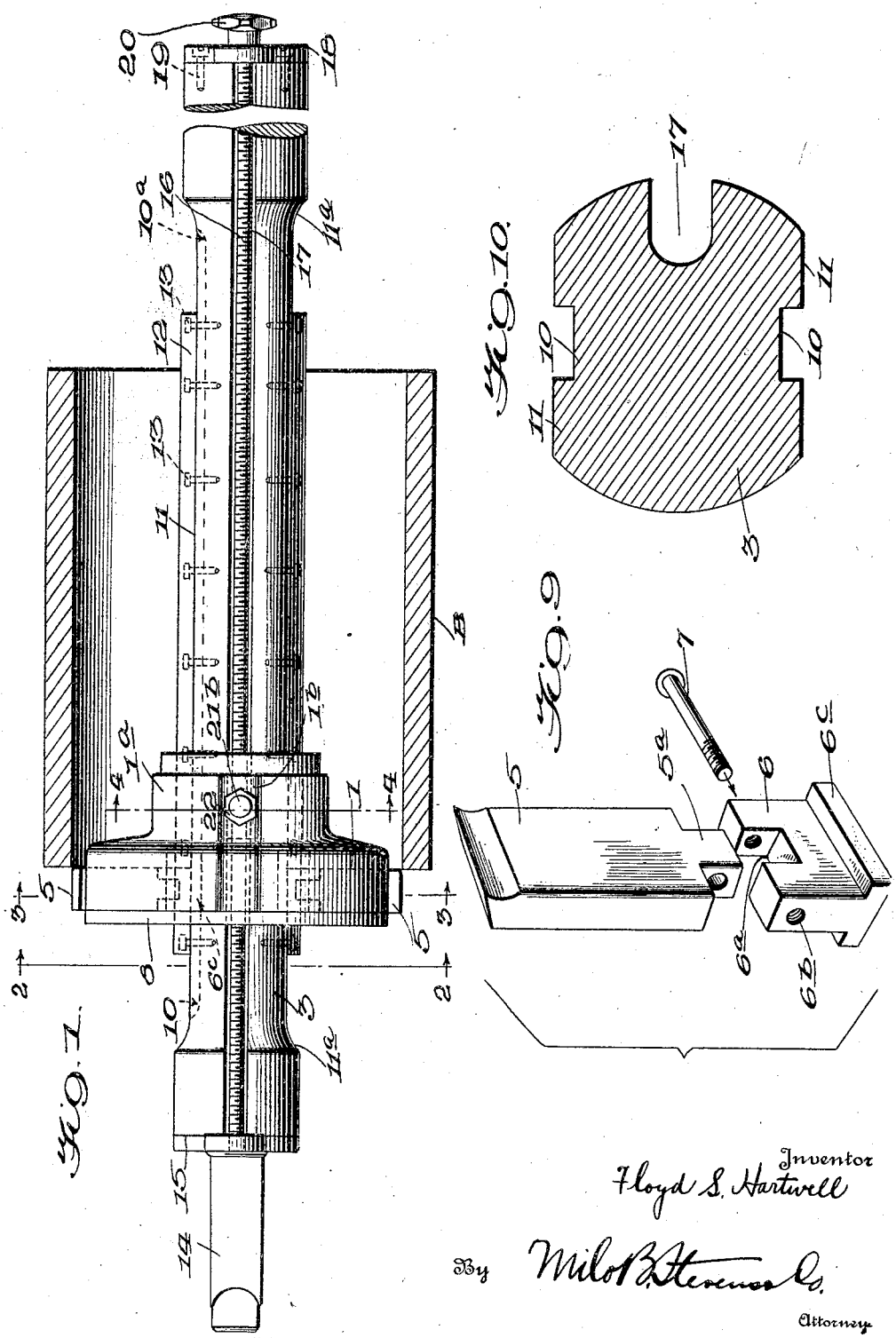

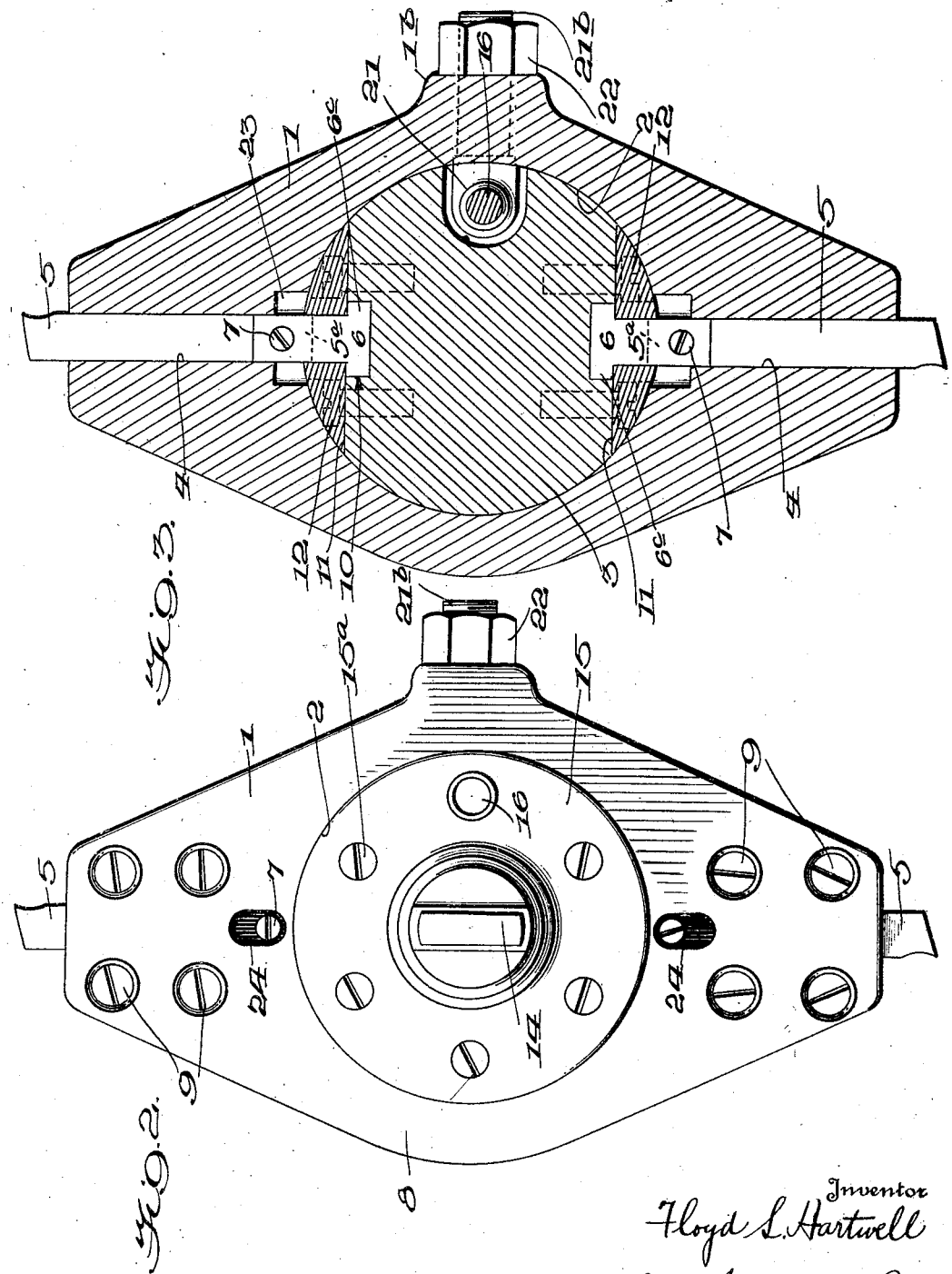

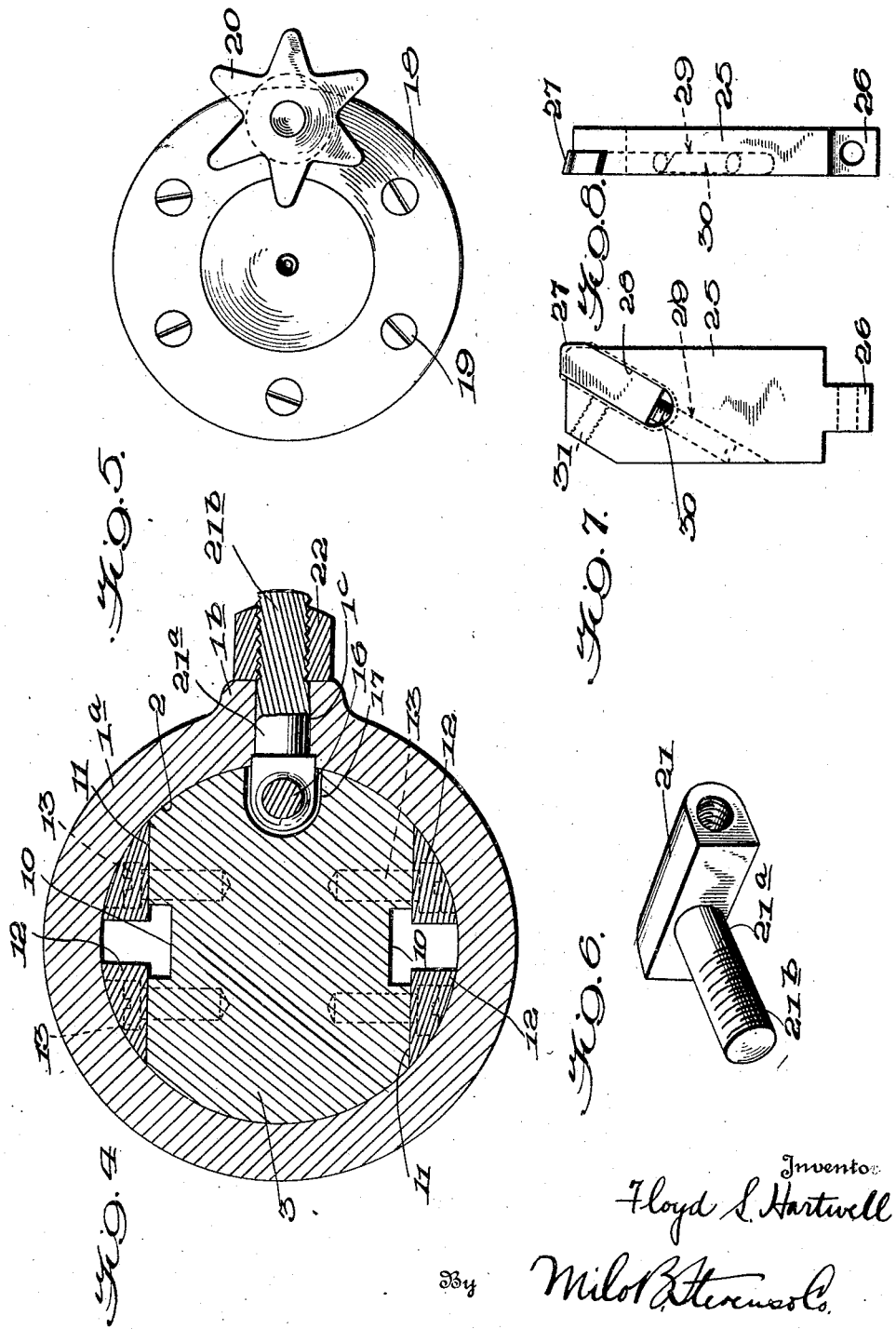

Patented July 14, 1931

1,814,922

UNITED STATES PATENT OFFICE

FLOYD S. HARTWELL, OF CLEVELAND, OHIO

TAPER BORING TOOL

Application filed December 17, 1926. Serial No. 155,505.

My invention relates to boring bars and particularly to such as are especially designed for taper boring.

The taper boring bars of the prior art, with which I am familiar, are open to many objections. In the first place, when it is desired to taper bore a piece of tubular work a distance shorter than the thickness of the boring or bit carrying head, it is necessary to employ a boring bar having special means for receding the bits from engagement with the work and into the head when the cut is complete. The structural arrangement of such a bar prevents its use for boring tapers of a length longer than the thickness of the bit carrying head. Accordingly it is necessary that a shop be equipped with a second type of tool for cutting long tapers. In these latter boring bars of the long-taper type, tool makers have resorted to numerous expedients, as for instance, sine bars with sliding connections which carry the boring head, or geared scrolls for moving the tools in and out of the tapers. Such structures in a long taper boring bar are expensive to manufacture and difficult to operate and keep up.

It is therefore the primary object of my invention to overcome the aforenoted objections by the provision of a very simple, durable, easily operated, and inexpensive boring bar which is capable of boring a predetermined length of taper in tubular work of any diameter capable of receiving the bar, the length of taper that may be bored being limited only by the length of the bar, and the bar itself being of any desired length that may be adapted for use in connection with the different types of lathes or boring machines.

Another object of the invention is to provide in a tool of this kind a novel and improved means whereby the cutting bits may be readily removed and replaced without the necessity of disturbing any of the associated elements of the cutter head.

The invention further contemplates a structure whereby the feet or bar engaging portions of the cutting bits will be automatically receded into the cutting head after the latter has passed through the work so that no damage will be done to the tool in the event that the operator is not on hand to shut off the boring machine when the cutter head reaches the end of the tapered portion of the bar.

The foregoing and other objects of the invention are attained by means of a novel combination and arrangement of parts to be hereinafter described and claimed, and in order that the same may be better understood, reference is had to the accompanying drawings forming a part of this specification. The drawings illustrate the now preferred embodiment of the invention, but it is to be understood that various changes and modifications thereof will immediately suggest themselves to those skilled in the art without departing from the spirit and scope of the invention as claimed.

In the drawings, wherein the same reference characters designate the same parts in all views, Figure 1 is a side elevation, partly broken, of a taper boring bar constructed in accordance with my invention, a bushing to be taper bored being shown in longitudinal section;

Figure 2 is an elevation of one end of the bar and showing the cutter head;

Figure 3 is a cross section through the cutter head taken on the line 3—3 of Figure 1;

Figure 4 is a cross section on the line 4—4 for Figure 1;

Figure 5 is a view similar to Figure 2 of the opposite end of the bar, the cutter head being removed;

Figure 6 is a detail perspective view of the boring head feed nut with which the worm of the star feed mechanism cooperates to progressively advance the cutter head in the boring operation;

Figures 7 and 8 are plan and edge views, respectively, of an adjustable type of cutter bit which may be employed;

Figure 9 is a group perspective view of a cutter bit and its carrier shoe and illustrating how the bit may be readily detached from the shoe, and Figure 10 is a cross section through the boring bar with all associated elements removed.

Referring specifically to the drawings and particularly to Figures 1 and 3, numeral 1 designates the boring head having a central opening 2 whereby it may be slidably mounted upon the cylindrical boring bar 3. In one face of the boring head 1 are cut a pair of diametrically opposite radial slots 4 extending from the opening 2 through the sides of the head. Each slot 4 receives a cutting bit 5 with a close sliding fit, and the inner end of each bit is formed with a transversely apertured boss 5a adapted to fit in a recess 6a of the T-shaped carrier 6. As best shown in Figures 3 and 9, a screw 7 threaded through alined holes 6b in the carrier 6 and the apertured boss 5a serves to detachably connect each carrier and bit. Also it is noted that the end of each boss 5a flatly contacts with the bottom of its carrier recess 6a and that the shoulders at either side of each boss flatly contact with the upstanding edge portion of the carrier 6 so as to rigidly support the bit 5 and relieve the screw 7 of strain when the tool is used.

A cover plate 8, which is screwed as at 9 to the end of the boring head 1, closes the open sides of the slots 4 and holds the bits 5 in place.

As the head 1 moves along the bar 3, the progressive retraction or advancement of the bits 5 to produce a desired taper bore is effected by the sliding engagement of the flanged bit carrier bases 6c in longitudinally extending taper grooves 10 cut in diametrically opposite flattened surfaces 11 of the boring bar 1. A pair of spaced metal strips 12 are screwed, as at 13, to the flattened surfaces 11 to overhang the grooves 10 to slidingly hold the flanged carrier base portions 6c therein as the boring head moves along the bar. Figures 3 and 4 clearly show that the exterior surfaces of strips 12 are milled to the exact diameter of the bar 1 so that they are free to pass into the opening 2 of the boring head.

The flattened surfaces 11 and the bottoms of the grooves 10 are milled to one half the taper which the tool is designed to cut. For example, if the particular bar is designed for boring a taper of one eighth (⅛) inch per foot, then the inward taper of each surface 11 and groove 10 would be one sixteenth (1/16) inch per foot in the direction of one end of the bar. Attention is called to the fact that to prevent any play of carriers 6 in grooves 10, the bottom of each bit carrier 6 and the top surfaces of its base flanges 6c are milled to correspond to the taper of surfaces 11 and grooves 10. As viewed in Figure 1 the surfaces 11 and grooves 10 taper inward toward the right hand end of the bar,—the tool being in its starting position for taper boring a bushing B. It will be understood, of course, that the boring head 1 may be readily removed and applied to varyingly tapered bars according to the exact taper required in a given case.

In carrying out the invention the bar 3 is provided at one end with a shank 14 for reception in a rotary chuck of a boring machine or lathe. The shank 14 is carried by a plate 15 which is bolted to the end of the bar 3 as indicated at 15a or can be turned on an extension of the bar 3 so as to be solid or integral therewith.

As has been previously stated the boring head 1 is designed to be progressively moved longitudinally along the bar during the rotation thereof. The means for accomplishing this end includes an elongated worm 16, eccentrically positioned with respect to the axis of the bar 3 and which is received in a longitudinal groove 17 extending the full length of the bar. One end of the worm 16 is journalled in the shank carrying plate 15 and the opposite end in a similar plate 18 bolted as at 19 to the opposite end of the bar 3. The last mentioned end of the worm projects through the plate 18 and has keyed thereon an operating element in the form of a star wheel 20. At each revolution of the bar 3, one point of the star wheel is engaged as usual by a fixed lug carried by some part of the boring machine, thus giving the worm a part turn.

Referring to Figures 2 and 3 it is observed that the hub portion 1a of the head 1 is provided at one side with a thickened boss like portion 1b through which is bored a hole 1c for snugly receiving the cylindrical shank 21a of a feed nut 21. The worm 16 takes in the nut 21 whereby the head 1 will be moved longitudinally along the shaft through the partial rotation of the worm with each revolution of the shaft. The outer end of the shank 21a of the feed nut is threaded as at 21b and receives a nut 22 as shown, so that the feed nut 21 may be firmly bound against the recessed inner surface of the boss 1b. By this arrangement it will be appreciated that the feed nut will be rigidly connected to the head 1.

Figure 1 clearly shows that the strips 12 which confine the bit carriers 6 in the grooves 10 extend to a point substantially beyond the ends of the bushing B. The purpose of this is to guarantee sufficient support for the bit carriers 6 on entering and leaving the cut so that the bits 5 will run smooth and true. The flattened surfaces 11 extend substantially beyond the ends of the strips 12 and terminate in outwardly sloping portions 11a to the cylindrical end portions of the bar. The taper grooves 10 also terminate at each end in outwardly sloping portions designated at 10a and merging with the surfaces 11 short of the outwardly sloping portions 11a,—all of which is depicted in Figure 1. By the construction just recited, the carriers 6, on leaving the cut will ride outwardly onto the surface 11, passing from thence to the cylindrical end portion of the bar 3. Thus, no damage will be done by the continued movement of the head 1 beyond the ends of the surfaces 11, in the event that the operator is not on hand to shut off the boring machine on completion of the cut. This outward movement of the bit carriers 6 positions them in the rectangular head recesses 23 (Figure 3) through which the bit grooves 4 communicate with the medial opening 2 in head 1. It is believed to be obvious that with the bit carrier 6 receded into the recesses 23, the boring head will continue to slide along the bar 3 until the power is shut off.

Referring to the Figures 1 and 2 the cover plate 8 is shown as provided with two slots 24 (Figure 2) which expose the heads of the screws 7 which connect the bits 5 to their carriers 6. This arrangement permits of the ready substitution of bits of different lengths to suit the particular diameter of work at hand. It is a matter of but a minute or two to remove the screw 7, insert the new bit and replace the screw.

In some instances it may be desirable to use an adjustable form of bit such as is disclosed in Figures 7 and 8. Here, the bit comprehends a body 25 having an apertured carrier engaging lug 26. The cutting element 27 is slidably received in a diagonal undercut groove 28 the inner end of which terminates in a tapped bore 29 for a feed screw 30. By adjusting the feed screw 30 the outer end of the cutting element 27 may be projected the desired distance from the open outer end of the groove 28. A set screw 31 is designed to engage the cutting element 27 to lock same securely in cutting position.

From the foregoing description it will be readily seen that the tool can be readily assembled; no unusual skill is necessary on the part of the operator. By the employment of bits 5 of different lengths and starting the head 1 at different points along the bar a taper of any length can be bored in tubular work of any diameter capable of receiving the bar.

Having thus described my invention, what I claim as new and desire to secure by Letters Patent is:

1. In a boring tool of the class described comprising a bar having means for attachment to a rotating drive means, a head slidable on said bar and means for slidably mounting said head upon said bar; said head having a recess opening from said bar and a slot communicating from said recess through the side of the head, a bit carried in said slot and having a shouldered base portion, said bar having a longitudinal guide groove for receiving the base portion of said bit, strips carried by said bar and overhanging said groove to confine the base portion therein, said strips terminating short of one end of said groove, and the ends of said groove having outwardly inclined portions leading to the surface of the bar, whereby the shouldered base portion of said bit will be actuated into said recess when the head is slid past the end of said groove.

2. In a boring tool of the class described comprising a bar having means for attachment to a rotating drive means, a head having an opening therein for receiving said bar and slidably mounting the head thereon; said head having recesses communicating with said opening and bit receiving slots leading from said recesses through the sides of said head, bits removably carried in said slots, carriers for said bits and having portions extending into said bit slots, said carriers having laterally projecting base portions, means for detachably connecting said bits and carriers, said bar having undercut guide grooves for said carriers, said guide grooves tapering in the direction of the axis of the bar, the ends of said grooves sloping outwardly to the surface of said bar, means for progressively sliding said carrier along said bar in the rotation thereof, and the outwardly sloping ends of said undercut grooves actuating said carrier base portions into said head recesses after the boring operation has been completed.

3. In a boring tool of the class described comprising a bar having means for attachment to a rotating drive means, a head having an opening therein for receiving said bar and slidably mounting the head thereon; said head having recesses communicating with said opening and bit receiving slots leading from said recesses through the sides of said head, bits removably carried in said slots, carriers for said bits and having portions extending into said bit slots, said carriers having laterally projecting base portions, means for detachably connecting said bits and carriers, said bar having undercut guide grooves for said carriers, said guide grooves tapering in the direction of the axis of the bar, the ends of said grooves sloping outwardly to the surface of said bar, the outwardly sloping ends of said undercut grooves actuating said carrier base portions into said head recesses after the boring operation has been completed, and said head having transverse openings communicating with said bit slots and exposing said bit and carrier connection means to permit removal and replacement of the bits.

4. In a tool of the class described comprising a bar having means for engagement in a rotary drive means, a boring head having an opening therein whereby the head is slidably mounted upon said bar, said head having bit receiving slots cut in one face and communicating from said opening through the sides of the head, removable bits slidably carried in said slots and adapted to project from the outer ends thereof, carrier elements for the bits, means for detachably connecting said bits and carriers, said bar having longitudinal surface grooves for slidably receiving said carriers and the surface of said bar adjacent said grooves being plane, metal confining strips detachably mounted upon said plane surfaces and overhanging said grooves for holding the carriers therein, a cover plate mounted upon the aforementioned face of said head for closing the open sides of said bit slots, said cover plate having openings therein exposing said bit and carrier connecting means for removal or insertion therethrough, the plane surfaces and the ends of said carrier grooves tapering outwardly and said head having recesses surrounding said bit grooves into which said carriers are designed to recede when the head reaches the outwardly tapered ends of said plane surfaces and grooves, said confining strips terminating short of the outwardly sloping ends of said surfaces and grooves to permit said carriers to move into said recesses, said bar having a longitudinal open ended surface groove extending its full length and designed to receive a worm, bearing plates removably fastened to the ends of said bar, a feed nut carried by said head and extending into said bar groove to receive a worm, whereby the head will be moved longitudinally along said bar as the worm is turned, and a star wheel keyed upon the projecting end of said worm whereby to engage a fixed element on each revolution of said bar to thus partially rotate said worm and progressively move the head longitudinally along the bar as the latter rotates.

5. In a boring tool, the combination of a boring bar, a slot formed longitudinally in said bar, spaced strips attached on each side of the slot and partially overlying the same to form a substantial T-groove, a carrier slidably mounted in the groove, a cutting tool detachably fixed to said carrier, a head slidably mounted on the bar having a radial slot adapted to receive and provide a lateral support for said tool, whereby a radial thrust of the tool may be transmitted directly to the bottom of said groove, a feed screw positioned longitudinally in the boring bar, and a nut in said head engaging said feed screw to shift said tool longitudinally of said bar.

6. In a boring tool, the combination of a boring bar, a plurality of surface grooves formed longitudinally in said bar, spaced strips attached on each side of said grooves and partially overlying the same to form substantial T-grooves, carriers slidably mounted in said T-grooves, cutting tools interchangeably and detachably fixed to said carriers, a head slidably mounted on the bar having radial slots adapted to receive and provide lateral support for said tools, whereby the radial thrust of the tools may be transmitted directly to the bottom of said grooves, a feed screw positioned longitudinally in the boring bar, and a nut in said head engaging said feed screw and lying partially within the said head adapted to shift the tool longitudinally of the bar.

7. In a boring tool, the combination of a boring bar, grooves formed longitudinally in said bar, spaced strips attached on each side of said grooves and partially overlying the same to form substantial T-grooves, carriers slidably mounted in said grooves, cutting tools provided with depending shanks adapted to be received in said carriers and to be detachably secured thereto, a head completely surrounding said bar and slidably mounted thereon, and having radial slots adapted to receive and provide lateral supports for said tools, whereby the radial thrust of the tools may be transmitted directly to the bottom of said T-grooves, a feed screw positioned longitudinally in the boring bar and a nut in said head engaging said feed screw to shift said tool longitudinally of said bar.

In testimony whereof I affix my signature.

FLOYD S. HARTWELL.